US012236980B1

(12) United States Patent
Turgut et al.

(10) Patent No.: US 12,236,980 B1
(45) Date of Patent: *Feb. 25, 2025

(54) METHOD AND APPARATUS FOR FRAME ACCURATE HIGH RESOLUTION VIDEO EDITING IN CLOUD USING LIVE VIDEO STREAMS

(71) Applicant: Google LLC, Mountain View, CA (US)

(72) Inventors: Alper Turgut, San Francisco, CA (US); Oztan Harmanci, Mountain View, CA (US); Ismail R. Haritaoglu, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,354

(22) Filed: Dec. 29, 2022

Related U.S. Application Data

(63) Continuation of application No. 17/379,910, filed on Jul. 19, 2021, now Pat. No. 11,545,185, which is a
(Continued)

(51) Int. Cl.
*G11B 27/02* (2006.01)
*G11B 27/10* (2006.01)
(Continued)

(52) U.S. Cl.
CPC .............. *G11B 27/02* (2013.01); *G11B 27/10* (2013.01); *H04N 21/2181* (2013.01);
(Continued)

(58) Field of Classification Search
CPC .... G11B 27/02; G11B 27/10; H04N 21/2181; H04N 21/2187; H04N 21/23424; H04N 21/234363; G06F 16/4393
See application file for complete search history.

(56) References Cited

U.S. PATENT DOCUMENTS 5,442,744 A 8/1995 Piech
5,513,260 A 4/1996 Ryan
(Continued)

FOREIGN PATENT DOCUMENTS

CN 101325687 A 12/2008
CN 101356820 A 1/2009
(Continued)

OTHER PUBLICATIONS

Pantos R: "HTTP Live Streaming Draft-Pantos-HTTP-LiveStreaming-00", Internet Citation, May 1, 2009 (May 1, 2009), pp. 1-17, XP002606603.
(Continued)

*Primary Examiner* — Girumsew Wendmagegn
(74) *Attorney, Agent, or Firm* — Lowenstein Sandler LLP

(57) ABSTRACT

A system and method for frame accurate editing of high resolution video content is disclosed. A method includes providing a low resolution video content displayed in a first viewing portion of an edit user interface, wherein the low resolution video content corresponds to a high resolution video content of the video content, receiving, via the viewing portion of the user interface, user input identifying a first start point and/or a first end point within the low resolution video content, and transmitting the first start point and/or the first end point to a server to obtain a respective intermediate video segment of an intermediate resolution video content corresponding to the high resolution video content. The method further includes presenting the respective intermediate video segment in a second viewing portion of the edit user interface, the second viewing portion comprising a frame identifying section to identify frames corresponding to the first start point and/or the first end point, receiving user input identifying a second start point and/or a second end point from within the intermediate resolution video content,
(Continued)

and transmitting the second start point and/or the second end point to the server to obtain a respective high resolution video segment from the high resolution video content for presentation to the user.

22 Claims, 4 Drawing Sheets

Related U.S. Application Data continuation of application No. 15/591,012, filed on May 9, 2017, now Pat. No. 11,069,378.

(60) Provisional application No. 62/334,228, filed on May 10, 2016.

(51) Int. Cl.
*H04N 21/218* (2011.01)
*H04N 21/2187* (2011.01)
*H04N 21/234* (2011.01)
*H04N 21/2343* (2011.01)
*G06F 16/438* (2019.01)

(52) U.S. Cl.
CPC ... *H04N 21/2187* (2013.01); *H04N 21/23424* (2013.01); *H04N 21/234363* (2013.01); *G06F 16/4393* (2019.01)

(56) References Cited

U.S. PATENT DOCUMENTS

| | | | |
|---|---|---|---|
| 5,539,395 A | 7/1996 | Buss et al. | |
| 5,577,135 A | 11/1996 | Grajski | |
| 5,659,613 A | 8/1997 | Copeland | |
| 5,668,603 A | 9/1997 | Copeland | |
| 5,721,788 A | 2/1998 | Powell | |
| 5,883,959 A | 3/1999 | Kori | |
| 5,917,943 A | 6/1999 | Washizawa | |
| 6,018,374 A | 1/2000 | Wrobleski | |
| 6,026,189 A | 2/2000 | Greenspan | |
| 6,173,275 B1 | 1/2001 | Caid | |
| 6,373,960 B1 | 4/2002 | Conover | |
| 6,381,367 B1 | 4/2002 | Ryan | |
| 6,404,925 B1 | 6/2002 | Foote | |
| 6,438,275 B1 | 8/2002 | Martins | |
| 6,539,395 B1 | 3/2003 | Gjerdingen | |
| 6,711,293 B1 | 3/2004 | Lowe | |
| 6,774,917 B1 | 8/2004 | Foote | |
| 6,785,815 B1 | 8/2004 | Serret-Avila | |
| 6,937,766 B1 | 8/2005 | Wilf | |
| 6,975,746 B2 | 12/2005 | Davis | |
| 6,975,755 B1 | 12/2005 | Baumberg | |
| 7,043,019 B2 | 5/2006 | Tehranchi | |
| 7,055,169 B2 | 5/2006 | Delpuch | |
| 7,167,574 B2 | 1/2007 | Kim | |
| 7,177,470 B2 | 2/2007 | Jasinschi | |
| 7,185,201 B2 | 2/2007 | Rhoads | |
| 7,218,754 B2 | 5/2007 | Schumann | |
| 7,272,240 B2 | 9/2007 | Goldberg | |
| 7,298,930 B1 | 11/2007 | Erol | |
| 7,325,013 B2 | 1/2008 | Caruso | |
| 7,421,376 B1 | 9/2008 | Caruso | |
| 7,650,361 B1 | 1/2010 | Wong | |
| 8,099,508 B2 | 1/2012 | Mao | |
| 8,160,366 B2 | 4/2012 | Nakamura | |
| 8,200,021 B2 | 6/2012 | Iwamoto | |
| 8,234,350 B1 | 7/2012 | Gu | |
| 8,515,212 B1 | 8/2013 | Bengio | |
| 8,515,241 B2 | 8/2013 | Forsyth | |
| 8,607,283 B2 | 12/2013 | Civanlar | |
| 8,677,428 B2 | 3/2014 | Lewis | |
| 8,887,215 B2 | 11/2014 | Fisher | |
| 8,943,215 B2 | 1/2015 | Patten | |
| 9,015,151 B1 | 4/2015 | Margulis | |
| 9,066,115 B1 | 6/2015 | Cherry | |
| 9,066,138 B1 | 6/2015 | Kraiman | |
| 9,084,030 B1 | 7/2015 | Nijim | |
| 9,167,278 B2 | 10/2015 | Sinha | |
| 9,448,619 B1 | 9/2016 | Kerns | |
| 9,491,499 B2 | 11/2016 | Wagenaar | |
| 9,552,356 B1 | 1/2017 | Edwards | |
| 9,613,042 B1 | 4/2017 | Joseph | |
| 9,654,817 B2 | 5/2017 | Li | |
| 10,104,137 B2 | 10/2018 | Salomons | |
| 10,148,716 B1 | 12/2018 | Joseph | |
| 10,306,208 B2 | 5/2019 | Hosea | |
| 10,595,054 B2 | 3/2020 | Turgut | |
| 10,785,508 B2 | 9/2020 | Haritaoglu | |
| 11,545,185 B1* | 1/2023 | Turgut | H04N 21/234363 |
| 11,589,085 B2 | 2/2023 | Turgut et al. | |
| 2002/0159641 A1 | 10/2002 | Whitney | |
| 2002/0178447 A1 | 11/2002 | Plotnick | |
| 2003/0005454 A1 | 1/2003 | Rodriguez | |
| 2003/0033347 A1 | 2/2003 | Bolle | |
| 2003/0045954 A1 | 3/2003 | Weare | |
| 2003/0151621 A1 | 8/2003 | McEvilly | |
| 2003/0195883 A1 | 10/2003 | Mojsilovic | |
| 2003/0229900 A1 | 12/2003 | Reisman | |
| 2004/0022447 A1 | 2/2004 | Mukhopadhyay | |
| 2004/0085339 A1 | 5/2004 | Divakaran | |
| 2004/0221237 A1 | 11/2004 | Foote | |
| 2004/0260786 A1 | 12/2004 | Barile | |
| 2005/0041159 A1* | 2/2005 | Nakamura | G11B 27/031 |
| | | | 386/280 |
| 2005/0125368 A1 | 6/2005 | Akahori | |
| 2005/0128286 A1 | 6/2005 | Richards | |
| 2005/0155063 A1 | 7/2005 | Bayrakeri | |
| 2005/0251532 A1 | 11/2005 | Radhakrishnan | |
| 2005/0262245 A1 | 11/2005 | Menon | |
| 2005/0278736 A1 | 12/2005 | Steelberg | |
| 2005/0289347 A1 | 12/2005 | Ovadia | |
| 2006/0029253 A1 | 2/2006 | Pace | |
| 2006/0101060 A1 | 5/2006 | Li | |
| 2006/0111801 A1 | 5/2006 | Weare | |
| 2006/0271973 A1 | 11/2006 | Jerding | |
| 2006/0279628 A1 | 12/2006 | Fleming | |
| 2006/0291690 A1 | 12/2006 | Roberts | |
| 2007/0025606 A1 | 2/2007 | Gholap | |
| 2007/0121997 A1 | 5/2007 | Harmanci | |
| 2007/0128899 A1 | 6/2007 | Mayer | |
| 2007/0143493 A1 | 6/2007 | Mullig | |
| 2007/0157231 A1 | 7/2007 | Eldering | |
| 2007/0171580 A1 | 7/2007 | Nishimura | |
| 2007/0180466 A1 | 8/2007 | Ando | |
| 2007/0217676 A1 | 9/2007 | Grauman | |
| 2007/0253594 A1 | 11/2007 | Lu | |
| 2007/0282898 A1 | 12/2007 | Stark | |
| 2008/0012397 A1 | 1/2008 | Buchholz | |
| 2008/0027931 A1 | 1/2008 | Lu | |
| 2008/0040807 A1 | 2/2008 | Lu | |
| 2008/0123976 A1 | 5/2008 | Coombs | |
| 2008/0166057 A1 | 7/2008 | Nakajima | |
| 2008/0186413 A1 | 8/2008 | Someya | |
| 2008/0271080 A1 | 10/2008 | Gossweiler | |
| 2009/0074235 A1 | 3/2009 | Lahr | |
| 2009/0089838 A1 | 4/2009 | Pino, Jr. | |
| 2009/0113512 A1 | 4/2009 | Collet | |
| 2009/0193473 A1 | 7/2009 | Moon | |
| 2009/0204901 A1 | 8/2009 | Dharmaji | |
| 2009/0324026 A1 | 12/2009 | Kletter | |
| 2010/0138865 A1 | 6/2010 | Rai | |
| 2010/0162330 A1 | 6/2010 | Herlein | |
| 2010/0299438 A1 | 11/2010 | Zimmerman | |
| 2011/0078551 A1 | 3/2011 | Zhang | |
| 2011/0191692 A1 | 8/2011 | Walsh | |
| 2011/0219035 A1 | 9/2011 | Korsunsky | |
| 2011/0314493 A1 | 12/2011 | Lemire | |
| 2012/0089910 A1 | 4/2012 | Cassidy | |
| 2012/0159337 A1 | 6/2012 | Travilla | |
| 2012/0166289 A1 | 6/2012 | Gadoury | |
| 2012/0173753 A1 | 7/2012 | Moorthy | |
| 2012/0216121 A1 | 8/2012 | Lin | |

(56) References Cited

U.S. PATENT DOCUMENTS

| | | |
|---|---|---|
| 2012/0240176 A1 | 9/2012 | Ma |
| 2012/0275597 A1 | 11/2012 | Knox |
| 2012/0278725 A1 | 11/2012 | Gordon |
| 2013/0060911 A1 | 3/2013 | Nagaraj |
| 2013/0163758 A1 | 6/2013 | Swaminathan |
| 2013/0195204 A1 | 8/2013 | Reznik |
| 2013/0219178 A1 | 8/2013 | Xiques |
| 2013/0219425 A1 | 8/2013 | Swartz |
| 2013/0227074 A1 | 8/2013 | Odlund |
| 2013/0291002 A1 | 10/2013 | Rothschild |
| 2013/0311780 A1 | 11/2013 | Besehanic |
| 2014/0029922 A1 | 1/2014 | Goldfeder |
| 2014/0082659 A1 | 3/2014 | Fife et al. |
| 2014/0095890 A1 | 4/2014 | Mangalore |
| 2014/0115060 A1 | 4/2014 | Kim |
| 2014/0136661 A1 | 5/2014 | Handa |
| 2014/0173660 A1 | 6/2014 | Correa |
| 2014/0176299 A1 | 6/2014 | Kumar |
| 2014/0181656 A1 | 6/2014 | Kumar |
| 2014/0201334 A1 | 7/2014 | Wang |
| 2014/0229970 A1 | 8/2014 | Besheanic |
| 2014/0259051 A1 | 9/2014 | Strein |
| 2014/0280781 A1 | 9/2014 | Gregotski |
| 2014/0282772 A1 | 9/2014 | Chen |
| 2014/0337904 A1 | 11/2014 | Panje |
| 2015/0058709 A1 | 2/2015 | Zaletel |
| 2015/0074232 A1 | 3/2015 | Phillips |
| 2015/0113021 A1 | 4/2015 | Martin |
| 2015/0172342 A1 | 6/2015 | Yin |
| 2015/0208103 A1 | 7/2015 | Guntur |
| 2015/0312299 A1 | 10/2015 | Chen |
| 2015/0346832 A1 | 12/2015 | Cole |
| 2015/0365622 A1 | 12/2015 | Ushiyama |
| 2015/0365725 A1 | 12/2015 | Belyaev |
| 2015/0382042 A1 | 12/2015 | Wagenaar |
| 2016/0006747 A1 | 1/2016 | Solis et al. |
| 2016/0064400 A1 | 3/2016 | Kurokawa |
| 2016/0065946 A1 | 3/2016 | Cole |
| 2016/0080470 A1 | 3/2016 | Shanson |
| 2016/0080810 A1 | 3/2016 | Dutta |
| 2016/0100224 A1 | 4/2016 | Nordstrom |
| 2016/0127260 A1 | 5/2016 | Gordon |
| 2016/0127440 A1 | 5/2016 | Gordon |
| 2016/0134910 A1 | 5/2016 | Davis |
| 2016/0149699 A1 | 5/2016 | Gauda |
| 2016/0173961 A1 | 6/2016 | Coan |
| 2016/0198202 A1 | 7/2016 | Van Brandenburg |
| 2016/0224799 A1 | 8/2016 | Uzun |
| 2016/0227228 A1 | 8/2016 | Pomeroy |
| 2016/0227279 A1 | 8/2016 | Fang |
| 2016/0292728 A1 | 10/2016 | Kang |
| 2016/0316233 A1 | 10/2016 | Ghadi |
| 2016/0328396 A1 | 11/2016 | Rajapakse |
| 2016/0337704 A1 | 11/2016 | Binder |
| 2017/0024098 A1 | 1/2017 | Doherty |
| 2017/0064400 A1 | 3/2017 | Riegel |
| 2017/0070758 A1 | 3/2017 | Phillips |
| 2017/0085933 A1 | 3/2017 | Czeck, Jr. |
| 2017/0148057 A1 | 5/2017 | Parameshwar |
| 2017/0150190 A1 | 5/2017 | Tarbox |
| 2017/0155973 A1 | 6/2017 | Muller |
| 2017/0171580 A1 | 6/2017 | Hirsch |
| 2017/0280181 A1 | 9/2017 | Ramaley |
| 2017/0302753 A1 | 10/2017 | Larumbe |
| 2017/0308681 A1 | 10/2017 | Gould |
| 2017/0353516 A1 | 12/2017 | Gordon |
| 2018/0063594 A1 | 3/2018 | Alexander |
| 2018/0139507 A1 | 5/2018 | Toksoz |

FOREIGN PATENT DOCUMENTS

| | | |
|---|---|---|
| CN | 101589617 A | 11/2009 |
| CN | 101689184 A | 3/2010 |
| CN | 102118401 A | 7/2011 |
| CN | 103155571 A | 6/2013 |
| CN | 103190156 A | 7/2013 |
| CN | 103491457 A | 1/2014 |
| CN | 103548359 A | 1/2014 |
| CN | 104854621 A | 8/2015 |
| CN | 105453573 A | 3/2016 |
| EP | 2242252 A2 | 10/2010 |
| JP | 3916025 B2 | 5/2007 |
| JP | 4150951 B2 | 9/2008 |
| JP | 2015097343 A | 5/2015 |
| KR | 20120133006 A | 12/2012 |
| WO | 0115451 A1 | 3/2001 |
| WO | 200622320 | 11/2006 |
| WO | 2007148290 A2 | 12/2007 |
| WO | 2015148513 A1 | 10/2015 |
| WO | 2015197815 A1 | 12/2015 |
| WO | 2016010668 A1 | 1/2016 |

OTHER PUBLICATIONS

Summons to Attend Oral Proceedings for European Patent Application No. 17725050.3, dated May 12, 2023, 9 pages.
China Notification on the Grant of Patent Right for Invention for Application No. 202110187393.1, dated Apr. 21, 2023, 7 pages.
International Search Report for PCT Patent Application No. PCT/US17/31991 dated Sep. 21, 2017, 21 pages.
International Search Report for PCT Patent Application No. PCT/US2017/032015 dated Aug. 4, 2017, 11 pages.
International Search Report and the Written Opinion for International Application No. PCT/US2017/032966, mailed Jul. 3, 2017, 6 pages.
Supplementary European Extended Search Report and the European Search Opinion: European Application No. 09801114, filed Apr. 10, 2012, 8 pages.
D. G. Lowe, "Object Recognition from Local Scale-Invariant Features", in International Conference on Computer Vision, vol. 2, 1999, pp. 1-8.
K. Mihcak and R. Venkatesan, "Blind Image Watermarking via Derivation and Quantization of Robust Semi-Global Statistics", in IEEE International Conference on Acoustics, Speech and Signal Processing, 2002, (4 pages).
T. Lindeberg, "Feature Detection with Automatic Scale Selection", International Journal of Computer Vision, vol. 30, No. 2, 1998, pp. 1-51.
A. Andoni and P. Indyk, "Near-Optimal Hashing Algorithms for Approximate Nearest Neighbor in High Dimensions", in Proceedings of the Symposium on Foundations of Computer Science, Jan. 2006, 10 pages.
A. Joly, O. Buisson and C. Frelicot, "Content-based Copy Retrieval using Distortion-based Probabilistic Similarity Search", IEEE Transactions on Multimedia, vol. 9, No. 2, p. 1-14, Feb. 2007.
J. Matas, O. Chum, M. Urban, T. Pajdla, "Robust Wide Baseline Stereo from Maximally Stable Extremal Regions", in British Machine Vision Conference., 2002, pp. 384-393.
K. Mikolajczyk and C. Schmid, "Indexing based on scale invariant interest points", in Proc. ICCV, 2001, 7 pages.
Chinese Patent Application No. 201780011326.6, Office Action dated Mar. 9, 2020, 6 pages.
Chinese Patent Application No. 201780011328.5, Office Action dated Mar. 9, 2020, 8 pages.
Chinese Patent Application No. 201780011291.6, Office Action dated Sep. 29, 2021, 22 pages.
Partial European search report for European Patent Application No. 22174193.7, dated Sep. 9, 2022, 16 pages.
Extended European Search Report for European Application No. 22174193.7, mailed Dec. 12, 2022, 14 Pages.
Extended European Search Report for European Application No. 24169069.2, mailed Jul. 18, 2024, 08 Pages.
International Search Report and Written Opinion for International Application No. PCT/US2009/051843, mailed Mar. 3, 2010, 7 Pages.
Office Action for Chinese Patent Application No. 201780011326.6, mailed Aug. 14, 2020, 7 Pages.

(56) References Cited

OTHER PUBLICATIONS

Office Action for Chinese Patent Application No. 202110718868.5, mailed Feb. 7, 2024, 13 Pages.
Office Action for Chinese Patent Application No. 202110718868.5, mailed Jul. 31, 2024, 08 pages.
Office Action for Chinese Patent Application No. 202210859057.1, mailed Jun. 9, 2023, 12 pages.
Shum H.Y, et al., "A Virtual Reality System using the Concentric Mosaic: Construction, Rendering, and Data Compression," IEEE Transactions on Multimedia, Feb. 2005, vol. 7, pp. 85-95.
Zheyuan K., "Research of Wireless Multimedia Sensor Network Image Encoding Algorithm," China Master Theses Full-text Database, vol. of Information Technology, Dec. 2012, pp. 1-127.

* cited by examiner

METHOD AND APPARATUS FOR FRAME ACCURATE HIGH RESOLUTION VIDEO EDITING IN CLOUD USING LIVE VIDEO STREAMS

CROSS-REFERENCE TO RELATED APPLICATIONS

This application is a continuation application of co-pending U.S. patent application Ser. No. 17/379,910, filed Jul. 19, 2021, which is a continuation U.S. patent application Ser. No. 15/591,012, filed May 9, 2017, now U.S. Pat. No. 11,069,378, which claims priority to U.S. Provisional Application No. 62/334,228, filed May 10, 2016, each of which is incorporated herein by reference.

BACKGROUND

The subject matter disclosed herein relates to a method of providing editing of high resolution live video streams. More specifically, a method and apparatus for providing editing of high resolution live video streams to multiple users available on the cloud is disclosed.

Video streaming allows video content to be delivered to a video player via the internet. The video content is a video signal generated by a content provider for distribution to video consumers. The video signal may be provided in an uncompressed file format, such as a serial digital interface (SDI) format, or in a compressed format, such as a Moving Picture Experts Group (MPEG) file format or Transport Stream (TS) file format. The video signal is sent to an encoder which converts the file into a live streaming signal. The live streaming signal is preferably a segmented data stream that may be transmitted using standard Hypertext Transport Protocol (HTTP) over the internet. The live streaming signal may include multiple streams, where each stream may have a different data rate and/or different resolution.

Two common formats for the live streaming signal include HTTP Live Streaming (HLS) implemented by Apple® and MPEG-Dynamic Adaptive bitrate Streaming over HTTP (MPEG-DASH) implemented, for example, by web browsers such as Chrome®, Microsoft Edge®, and Firefox®. In addition to the segmented data stream, the encoder generates a manifest file. The manifest file contains information for a video player to play the segmented data stream such as the data rate and resolution of each stream and a playlist providing an address from which the video content may be retrieved. Historically, the encoder has generated a single manifest file for each encoded video signal, where the manifest file is distributed along with the streaming signal.

The live streaming signal and the manifest file are stored in one or more Content Delivery Networks (CDN). Each CDN includes a number of edge servers which store the streaming signal and manifest file until requested by a video player. When the streaming signal is provided to multiple CDNs, the CDNs may be in different geographic locations, such as the West Coast, East Coast, or Midwest. Each video player may select a CDN based, among other things, on its geographic proximity in order to reduce transmission latencies.

The video player may be any suitable electronic device to receive the streaming signal such as a desktop computer, a television, a laptop computer, a tablet, or a mobile phone. A user initiates a request to view desired video content on the video player. The video player includes video management software executing on the video player which has knowledge of the address of the CDN and which may provide a list of video content stored on the CDN to the user. After the user has selected a desired video, the video player, in turn, requests that the video content be transmitted from the CDN.

A high-resolution video requires a significant amount of storage when converted to digital data. Each pixel, for example, in each frame of a video has a digital representation. Thus, as the resolution increase (i.e., an increasing number of pixels) and the duration of the video content increases, the amount of storage required increases accordingly. For a live video stream, such as a concert or a sporting event, the size of files may reach into the hundreds of megabytes or gigabytes of data.

It is desirable at times to provide a portion of a live video stream, for example, as a promotional clip for a rebroadcast of the live event when reporting about the live event in a subsequent news broadcast or as a highlight clip inserted into another live stream. However, high quality editing of the live video stream is not without drawbacks. A primary challenge for editing live video stream is the size of the files. In order to edit digital video in a traditional manner with video editing software, the editor must have a copy of the original video content. However, downloading a copy of the digital file for the entire live video stream may require significant bandwidth or create a delay due to the file size. Further, it is common for tens or hundreds of outlets to request the live stream content at the same time. Each outlet would require a copy of the digital file to subsequently perform their editing. The high volume of users requesting the large data file would further tax the bandwidth of the server on which the file is stored and the network connection to the server.

Thus, it would be desirable to provide an improved system and method for frame accurate editing of high resolution video streams.

BRIEF DESCRIPTION

The subject matter disclosed herein describes a system and method for frame accurate editing of high resolution live video streams. A live capture module receives and stores the live stream in the original resolution it is being distributed and provides a low resolution copy of the live stream for editing. An edit module receives the low resolution stream and provides an interface for individual editors to edit the live stream video. The individual editor may search forward or backward through the low resolution video stream to identify a start and end point for each desired video segment. The edit module then retrieves and displays high resolution video corresponding to the selected start and end points from which the individual editor may then navigate identify a frame accurate mark point for each. A job manager coordinates each request for a video segment and delivers the requested video segment to the individual editors.

According to one embodiment of the disclosure, a method for editing live video content is disclosed. A low resolution video stream is generated from a high resolution video stream of the live video content. The high resolution video stream includes a plurality of frames and at least a portion of the plurality of frames from the high resolution stream are not included in the low resolution video stream. The low resolution video stream is displayed to a plurality of editors. Indications of a first start point and a first end point of a desired video segment are received within the low resolution video stream from each of the plurality of editors. A portion of the high resolution video stream is displayed to each of the plurality of editors, where the portion of the high resolution video stream displayed corresponds to the first start point and the first end point received from the corresponding editor. Indications of a second start point and a second end point corresponding to the portion of the high resolution video stream displayed are received, and each of the second start point and the second end point are frame accurate points within the high resolution video stream. A high resolution video segment is generated from the high resolution video stream as a function of the second start point and the second end point.

According to other aspects of the disclosure, the method may include an initial operation of storing the live video content in high resolution on a live capture module, and a video editor operative to execute in a cloud based service may perform the afore-mentioned operations. The video editor may include an edit module, where multiple instances of the edit module are executable in tandem and each of the plurality of editors' interfaces with a separate instance of the edit module. The low resolution video stream may be displayed in a first viewing window of the edit module, and the portion of the high resolution video stream may be displayed in a second viewing window of the edit module. The edit module may include an interface operative to receive the indication of the first and second start and end points from the corresponding editor.

According to yet another aspect of the disclosure, the video editor may also include a job manager. The job manager may receive the first and second start and end points from each edit module and may request each portion of the high resolution video stream corresponding to the first start and first end point from the live capture module. The job manager may also request each high resolution video segment corresponding to the second start and second end point from the live capture module. The job manager schedules the requests such that a communication bandwidth between the video editor and the live capture module is not exceeded.

According to still other aspects of the disclosure, generating the low resolution video stream may further include the operations of storing a plurality of thumbnail images where each thumbnail image corresponds to one of the plurality of frames of the high resolution video stream. Optionally, the operation of generating the low resolution video stream may further include the operations of identifying at least one marker embedded in the high resolution video stream and storing the marker in the low resolution video stream.

According to another embodiment of the disclosure, a system for editing a high resolution video stream is disclosed. The system includes an edit stream module having a non-transitory memory operative to store a low resolution video stream representative of the high resolution video stream and an edit module in communication with the edit stream module. The edit module is operative to read the low resolution video stream from the edit stream module, display an interface for a plurality of editors, display the low resolution video stream in the interface, receive an indication of a first start point and a first end point of a desired video segment within the low resolution video stream from each of the plurality of editors, and display a portion of the high resolution video stream on the interface. The portion of the high resolution video stream displayed on each interface corresponds to the first start point and the first end point received from the corresponding editor. The edit module is further operative to receive an indication of a second start point and a second end point corresponding to the portion of the high resolution video stream displayed, where each of the second start point and the second end point are frame accurate points within the high resolution video stream. The system also includes a job manager operative to generate a high resolution video segment from the high resolution video stream as a function of the second start point and the second end point.

According to another aspect of the disclosure, the job manager may include a queue operative to receive the first start point, the first stop point, the second start point, and the second stop point from the edit module. The job manager may also be in communication with the live capture module and either the live capture module or the job manager generates the portion of the high resolution video stream and the high resolution video segment.

According to still another embodiment of the disclosure, a method for editing live video content is disclosed. A low resolution video stream displayed in a first viewing window of an edit module is viewed. The low resolution video stream corresponds to a high resolution video stream of the live video content. A first start point and a first end point from within the low resolution video stream is selected and transmitted to a job manager. The job manager is operative to generate an intermediate video segment corresponding to the high resolution video stream as a function of the first start point and the second start point. The intermediate video segment is viewed in a second viewing window of the edit module, and a second start point and a second end point are selected from within the intermediate video stream. Each of the second start point and the second end point are frame accurate points within the intermediate video stream. The second start point and the second end point are transmitted to the job manager, where the job manager is operative to generate a high resolution video segment from the high resolution video stream as a function of the second start point and the second end point.

These and other objects, advantages, and features of the disclosure will become apparent to those skilled in the art from the detailed description and the accompanying drawings. It should be understood, however, that the detailed description and accompanying drawings, while indicating preferred embodiments of the present disclosure, are given by way of illustration and not of limitation. Many changes and modifications may be made within the scope of the present disclosure without departing from the spirit thereof, and the disclosure includes all such modifications.

BRIEF DESCRIPTION OF THE DRAWING(S)

Various embodiments of the subject matter disclosed herein are illustrated in the accompanying drawings in which like reference numerals represent like parts throughout, and in which.

Figure 1:
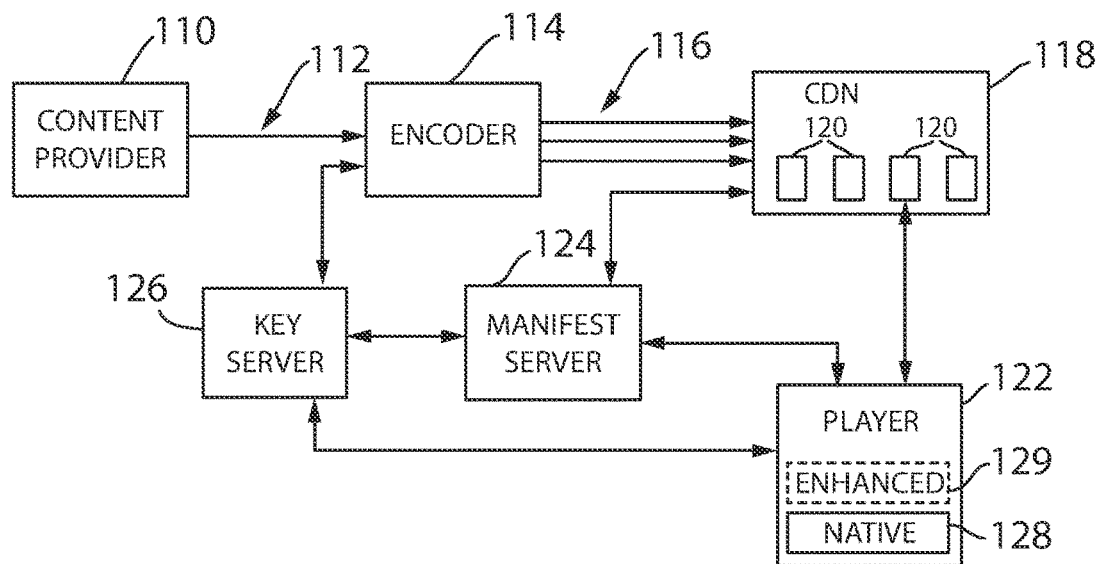
FIG. 1 is a block diagram representation of an environment for delivering live streaming video content.

In describing the preferred embodiments of the disclosure which are illustrated in the drawings, specific terminology will be resorted to for the sake of clarity. However, it is not intended that the disclosure be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Turning initially to FIG. 1, one environment for providing delivering high resolution streaming video to individual video players 122 is illustrated. A content provider 110 generates a video signal 112 to be distributed to video consumers. The video signal may be provided in an uncompressed file format, such as a SDI format, or in a compressed format, such as an MPEG or TS file format. The video signal 112 is sent to an encoder 114 which converts the file into a live streaming signal 116. The live streaming signal 116 is preferably a segmented data stream that may be transmitted using standard HTTP or HTTPS protocol over the internet. The live streaming signal 116 may include multiple streams, where each stream may have a different data rate and/or different resolution. The format of the live streaming signal may be, but is not limited to, HLS or MPEG-DASH. Still other protocols such as HTTP Dynamic Streaming (HDS) from Adobe® or Microsoft® Smooth Streaming and the like may be used without deviating from the scope of the disclosure.

In addition to the segmented data stream, the encoder generates a manifest file. The manifest file contains information for a video player 122 to play the segmented data stream such as the data rate and resolution of each stream and a playlist providing an address from which the video content may be retrieved. The encoder 114 generates a single manifest file for each encoded video signal, where the manifest file is distributed along with the streaming signal 1job m16 and stored on a CDN 118. It is noted that the "single" manifest file refers to a common or identical manifest file for each encoded signal. The manifest file may be comprised of multiple data files stored on the CDN where each manifest file contains a portion of the data required to playback the streaming signal. Further, for live streaming video, the manifest file may be updated and retransmitted at a periodic interval as new content is added from the live event. Although multiple files are used, the content generated by the encoder 114 for delivery to each video player 122 is the same. Each CDN 118 includes a number of edge servers 120 which store the encoded video signal 116 and manifest file until playback of the video content is requested by a video player 122. Although the embodiment illustrated in FIG. 1 shows a single CDN 118, it is contemplated that the encoded video signal 116 may be stored on multiple CDNs 118. The manifest file may include an address of each CDN such that playback may occur from any of the CDNs 118.

As further shown in FIG. 1, the illustrated environment includes a manifest server 124. The manifest server 124 is used to provide a unique manifest file, also referred to herein as a per-user manifest file, to each video player 122 for each requested video content. Each video player 122 includes a native video player module 128 which provides an interface to a user and which manages video playback on the video player 122. Some video players 122 may further include an enhanced video player module 129, illustrated as an optional module in FIG. 1. The enhanced video player module 129 may be a plug-in or other software module executing on the video player 122 that either complements (i.e., adds additional capabilities) or replaces (i.e., adds additional capabilities and incorporates the video interface and playback capabilities) the native video player module 128. When a user 125 requests video content for playback on the video player 122, the native or enhanced video player module 129 communicates with a manifest server 124 rather than the CDN 118 to obtain the manifest files for video playback. The manifest server 124 manages the retrieval and delivery of the manifest file generated by the encoder 114 to provide the unique manifest file to each video player 122.

Among the content delivered by video streaming is live events, such as sports events, concerts, news reports, and the like. At times it is desirable to provide segments of live events for viewing outside of the original streaming video. For example, a scoring play or other highlight may be replayed during the live stream of another, related sporting event where viewers of one event may be interested in the other event. Similarly, highlights of the sporting event or excerpts of a concert or breaking news event may be replayed during a subsequent news broadcast. It is, therefore, desirable to edit the original, live video stream to obtain a segment containing the desired content for redistribution.

Figure 2:
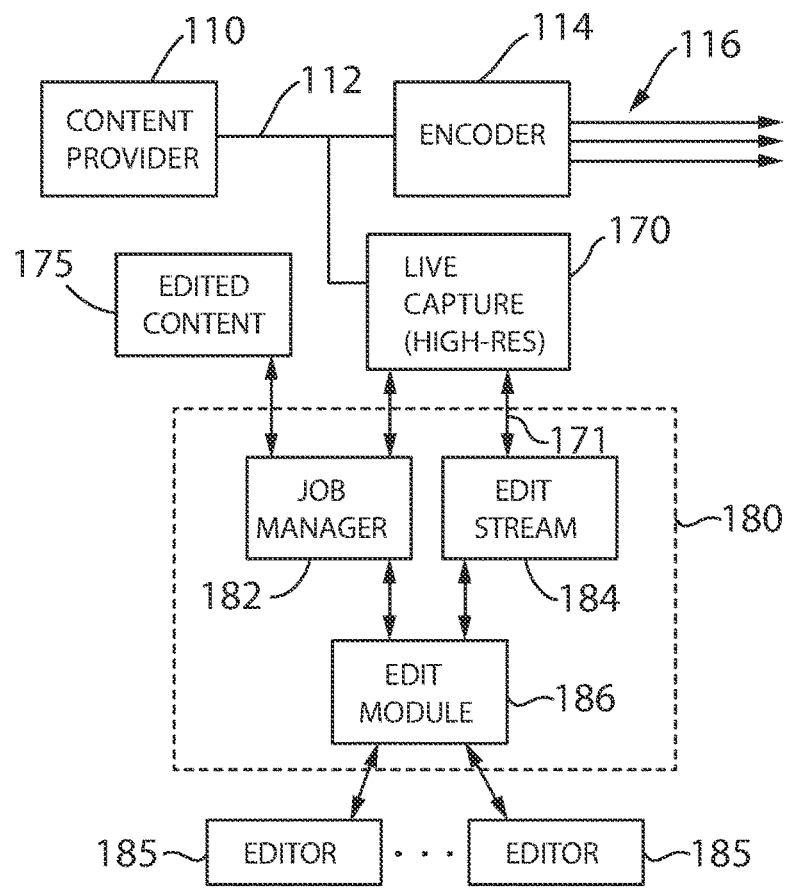
FIG. 2 is a block diagram representation of an environment for editing high resolution live streaming video according to one embodiment of the present disclosure.
Figure 3:
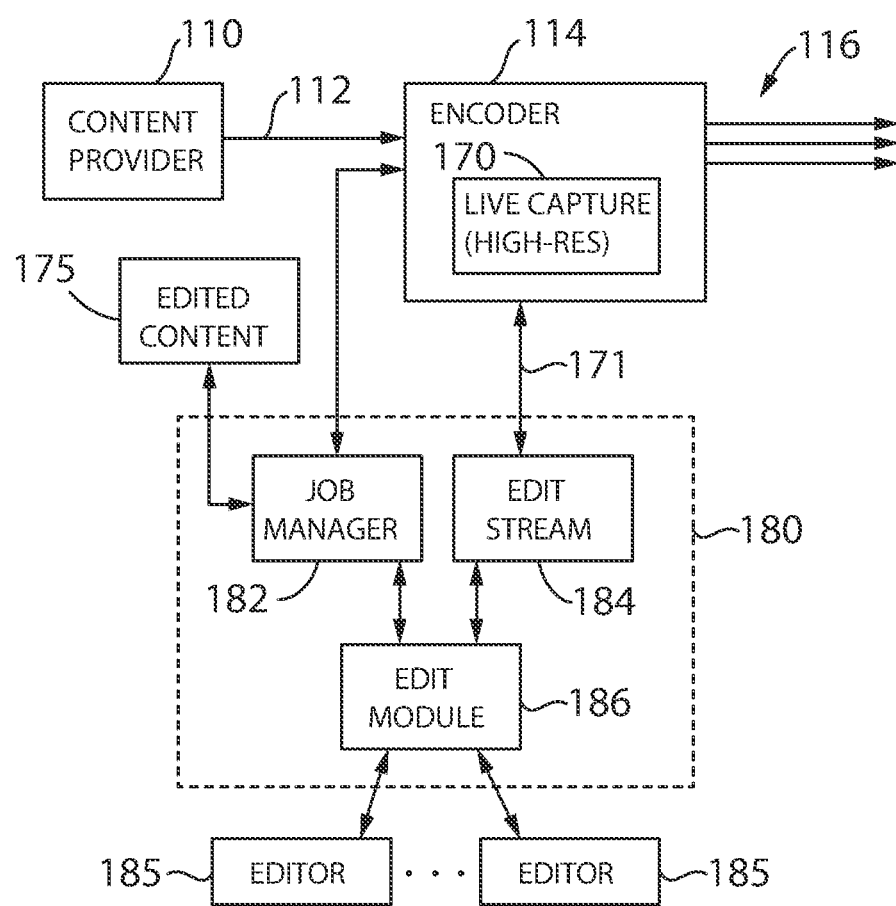
FIG. 3 is a block diagram representation of an environment for editing high resolution live streaming video according to another embodiment of the present disclosure.

Turning next to FIG. 2, a video editor 180 for the live video stream may be implemented locally on a dedicated server or servers or be implemented in the cloud, where resources are utilized on demand. The cloud may include multiple servers, storage devices, processing units, or a combination thereof at a single location or at multiple locations, wherein the locations may be interconnected via a network, such as the Internet. The servers, storage devices, and/or processing units may be utilized based, for example, on the required processing or storage requirements of an application. As the content provider 110 delivers the live video stream 112, a live capture module 170 stores the content of the video stream in the original resolution (i.e., a high resolution) it was delivered. It is contemplated that the live capture module 170 may be a dedicated server receiving and storing the live video stream. With reference also to FIG. 3, the live capture module 170 may be implemented together with the encoder 114 such that the live video stream 112 is delivered to a single device where it is both stored for later use as well as encoded for live content delivery. According to still another embodiment, the live capture module 170 may be implemented in whole or in part in the cloud.

The live video stream 112 is converted to a low resolution video stream 171 for subsequent edit operations. The low resolution video stream 171 becomes a proxy video stream on which edit operations may initially be performed without the bandwidth required for similar edit operations performed on the high resolution video stream 112. In the embodiment illustrated in FIG. 3, the live capture module 170 is located within the encoder 114. The encoder 114 may generate the desired low resolution video stream. Optionally, the live capture module 170 may be configured to generate the low resolution video stream 171.

The low resolution video stream may be one of the video signals 116 already generated by and output from the encoder 114. Optionally, a separate video signal having even lower resolution than one of the video signals 116 output from the encoder for viewing may be generated. It is contemplated that the low resolution video signal 171 may be generated, for example, by dropping a portion of the frames or by converting the image resolution of the stored live stream to a lower image resolution. The low resolution video signal 171 may include, for example, thumbnail images at discrete time intervals such as thirty second or one minute intervals illustrating representative content of the video signal. The low resolution video signal 171 may further include markers, such as close-captions, Society of Cable and Telecommunications Engineers (SCTE) signals, General Purpose Interface (GPI) signals and the like identifying, for example, an ad insertion location or other event within the video signal. The markers may be inserted into the live video stream by the content provider 110. The thumbnails or markers may be used to identify locations within the video signal containing desired video content.

Thumbnail images or markers for inclusion in the low resolution signal 171 may also be selected based on content rather than at discrete time intervals. During live events, captions (e.g. score in a sports event) are often presented at the start and end of a video segment. Similarly, advertisements are typically inserted at desirable break points, in a live video stream, such as after a scoring event in a sporting event or the completion of a song in a musical event. According to another embodiment, analysis of the video or audio content, indicating, for example, an abrupt change in the live video or audio may be used to identify a scene change and, therefore, a desirable thumbnail image for editing selection. According to yet another embodiment, program schedule information may be used to pre-mark suitable points for inclusion in the low resolution copy. It is contemplated that still other methods may be utilized to reduce the digital content and to generate the low resolution copy of the video stream.

The low resolution video signal 171 is stored in an edit stream module 184 for subsequent use in the editing process. According to one embodiment of the disclosure, the edit stream module 184 is a cloud-based server on which the low resolution signal 171 is stored. According to another embodiment of the disclosure, the edit stream module 184 may be incorporated with the live capture module 170. According to still another embodiment, the edit stream module 184 may access the stored version of the live video stream from the live capture module 170 and generate the low resolution signal 171.

The low resolution video signal 171 stored on the edit stream module 184 is used by individual editors 185 during the editing process to identify desired segments of the streaming video signal 112. Selection of desired video segments may be made, for example, based on the thumbnails, closed captions inserted into the video or other markers, such as an advertising marker. The low resolution copy includes less digital data and, therefore, requires less storage and less network bandwidth for transmission. In each embodiment, the low resolution stream is available for selection of a desired segment of the original high resolution live stream.

The video editor 180 includes an edit module 186 which provides an interface 200 for individual editors 185 to access the low resolution stream. Multiple individual editors 185 may access the edit module 186 at the same time. It is contemplated that access may require user identification credentials, such as a user name and password. Optionally, the edit module 186 may provide for guest access as well without having predefined credentials. Each editor 185 using the edit module 186 preferably defines a location at which edited contend is stored. As illustrated in FIG. 2, an edited content server 175 is shown. Although a server or cloud-based service may be provided to store selected video segments, it is contemplated that editors 185 may define a local storage location, a location in the cloud, or any other remote location to which the edited content is delivered upon completion. The edited content server 175 is representative of a storage location and encompasses all local and/or cloud based storage locations to which edited content is delivered. Each editor 185 may have a desired location defined within a user profile or, optionally, an editor 185 may define a desired delivery location at login or at any other suitable time during the editing process.

Figure 4:
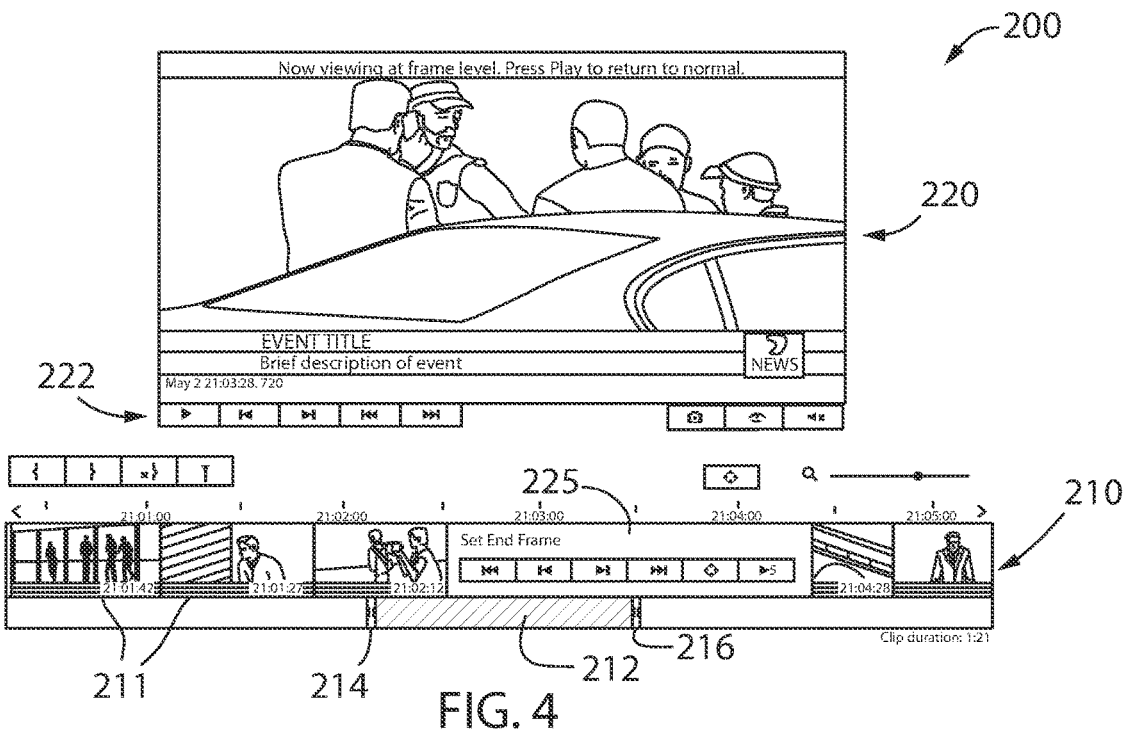
FIG. 4 is a screen capture of an interface for an edit module showing selection of low resolution content according to one embodiment of the disclosure.
Figure 5:
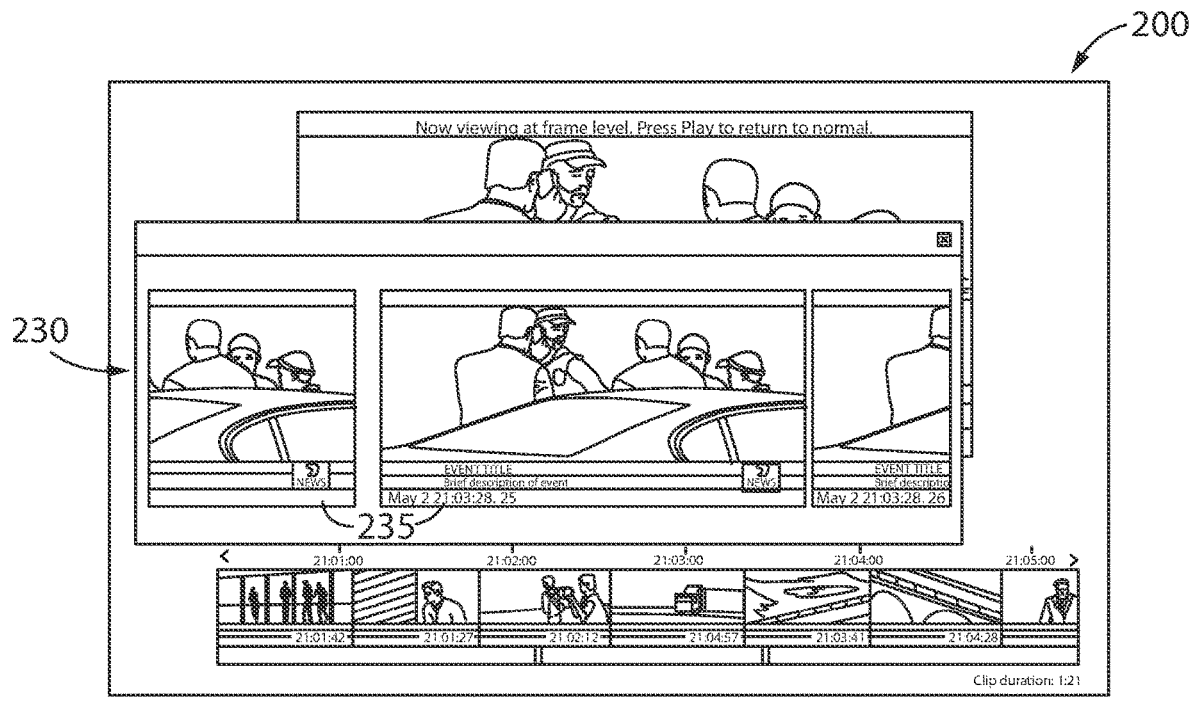
FIG. 5 is a screen capture of an interface for an edit module showing frame selection from high resolution content according to one embodiment of the disclosure.

With reference also to FIGS. 4 and 5, an interface 200 for the video editor is illustrated. The user interface 200 includes a first viewing window 210 for the low resolution video content. As shown in the illustrated embodiment, the low resolution video stream includes a series of thumbnail images 211, where each thumbnail image 211 is representative of a scene in the live video stream. The first viewing window 210 includes a slider bar 212 that may be used to scroll through the thumbnail images 211 allowing the editor 185 to view the content of the low resolution video stream. A left marker 214 and a right marker 216 may be moved to provide an initial identification of a start point and a stop point for a desired segment of the live video. A second viewing window 220 is provided to present further details of each of the scenes in the first viewing window 210. The editor may, for example, click on one of the thumbnail images 211 in the first viewing window to identify a start point for playback of the low resolution image. The identified start point is loaded into the second viewing window with standard playback controls 222.

The editor 185 may then use the edit module 186 to search through additional content in the second viewing window. The second viewing window may display content having an intermediate resolution, where the intermediate resolution includes more detail than the thumbnail images in the first viewing window but less detail than the original video signal 112. According to one embodiment, the intermediate resolution video stream for the video editor 180 may be a low resolution stream 116 output from the encoder 114. According to another embodiment, an intermediate resolution video stream is stored in the edit stream module 184, where the intermediate resolution video stream has a higher number of frames than the thumbnail content of the low resolution video stream or the intermediate resolution video stream may include all frames of the original video stream at a lower image resolution. According to still another option, the second viewing window may receive a portion of the high resolution video signal 112 for playback.

A job manager 182 may communicate with the edit module 186 to schedule delivery of high resolution or intermediate resolution video segments requested by the edit module 186. When an editor 185 selects start and end points of the video stream based on the low resolution data in the first viewing window 210, the job manager 182 obtains the content for the second viewing window 220. As previously indicated, the video content for the second viewing window 220 may be a portion of the high resolution content from the live capture module 170, a lower resolution output stream 116 stored in a CDN 118, or an intermediate resolution video stream stored in the edit stream module 184. Although the requested segment, as identified by the start and stop points selected in the thumbnail image 211, may be just a short segment of the original video stream 112, if a large number of individual editors 185 request content at the same time, the bandwidth between the video editor 180 and the live capture module 170 may still be overwhelmed. Consequently, the job manager 182 may queue requests for content for the second viewing window in the job manager 182 and execute the requests as the bandwidth permits.

Once the intermediate video content has been loaded into the second viewing window 220, the editor 185 begins to identify desired frames for a requested video segment at a finer temporal resolution than the coarser resolution provided by the thumbnail or marker inclusion in the low resolution video signal. The editor 185 may use the playback controls 222 on the second viewing window 220 to scroll forward or backward through the video content displayed in the second viewing window 220. Once the editor 185 is near a desired start or stop point, a selection bar 225 may be launched to identify specific frames for the start and stop points. If the video content in the second viewing window 220 is an intermediate resolution signal, the job manager 182 may then retrieve a segment of the high resolution video signal 112 from the live capture module 170 for final frame selection. Optionally, the high resolution video signal 112 may be provided in the second viewing window 220 subsequent to the low resolution content in the first viewing window 210 and the selected frames correspond to the desired video content.

A frame selection window 230 may also be provided to further assist an editor 185 in identifying a desired frame. Based on the start or stop points previously identified either in the low resolution or intermediate resolution video content, the job manager 182 retrieves a series of frames immediately preceding and following the selected points from the high resolution video content for display. An editor may step through individual frames to identify a frame accurate start and stop point within the high resolution video content. Frames are selected as the mark in, or start point, and the mark out, or stop point, for the desired video segment. The selection bar 225 may allow the editor 185 to move forward or backward through the video content in the second viewing window 220 on a frame-by-frame basis. Optionally, the frame selection window 230 may allow an editor to drag and slide frames forward or backward. When the desired mark in and mark out frames have been identified, the editor 185 may use the selection bar 225 to identify the frames as such.

Upon selection of the frame accurate start and stop points, the individual editor 185 sends the two points to the job manager 182 and an identifier corresponding to the live stream from which the two points were selected to create a video editing job. The individual editor 185 may then determine whether another segment is desired from the same live stream or another live stream. If another segment is desired, the process may be repeated to determine an additional set of start and stop points for a selected live video stream. Each set of start and stop points may define a video editing job for a specific video.

After the start and stop points and the video identifier have been sent to the job manager 182, the job manager adds the video editing job to the queue. The number of jobs present in the queue will vary as a function of the number of individual editors 185 accessing the live capture module 170 and of the rate at which the job manager 182 is able to process video edit jobs. The job manager 182 sends the start point, the stop point, and the identifier of the video to the live capture module 170. The live capture module 170 performs the editing function on the original high resolution content stored in the live capture module. The live capture module 170 creates the desired clip based on the start and stop points and delivers it to the edited content server 175. As previously discussed, the edited content server 175 is selected by the individual editor 185 as a desired storage location from which the editor 185 may distribute the edited segment. Once the clip has been generated, the job manager 182 removes the job from the queue and transmits a new job to the live capture module 170.

Figure 6:
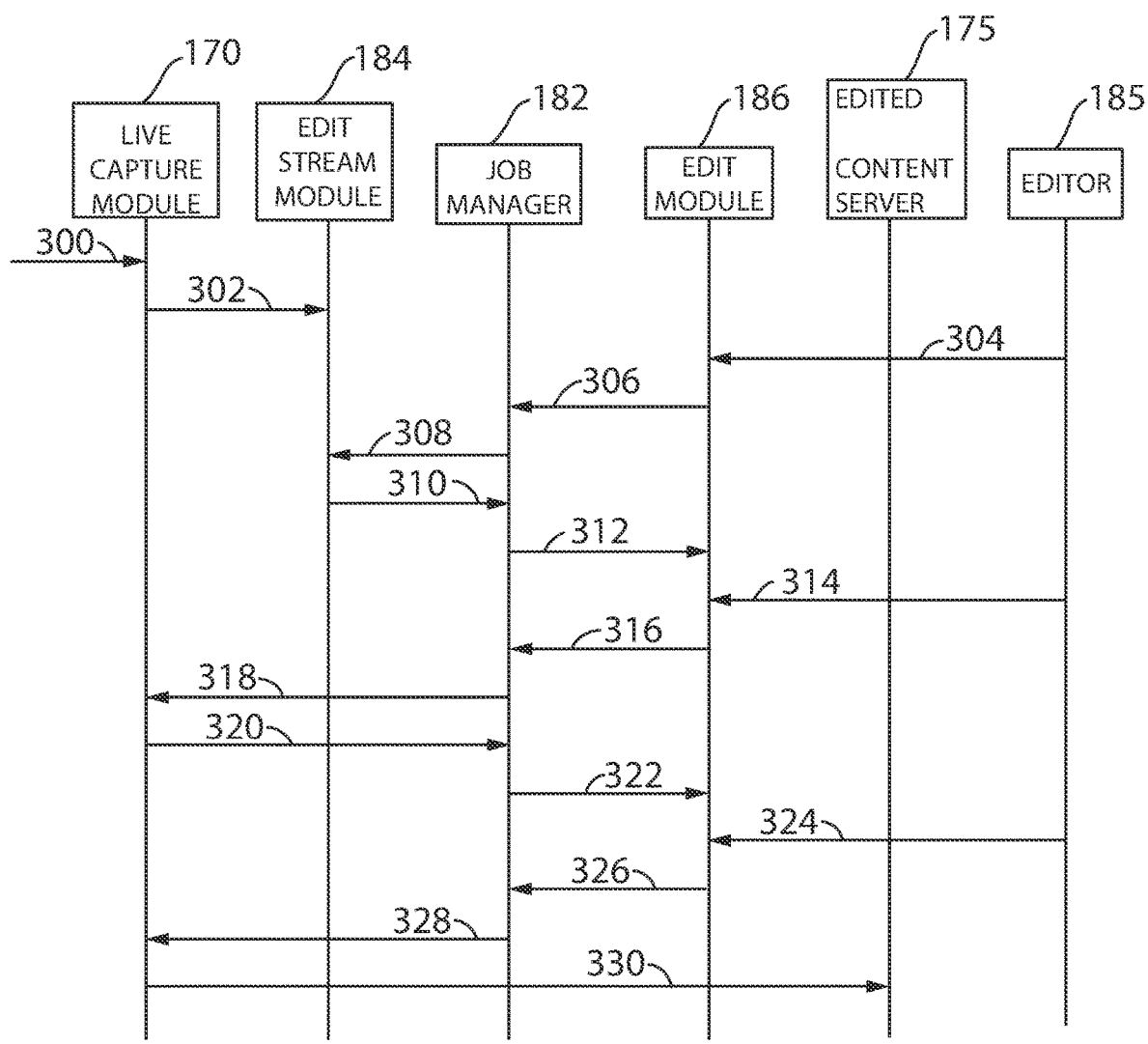
FIG. 6 is a flow diagram illustrating the performing of frame accurate editing of high resolution video using low resolution proxy video streams.

In operation, the above described system provides frame accurate editing of high resolution video using low resolution proxy video streams. With reference also to FIG. 6, the high resolution video signal 112 is live streamed from a content provider 110 at block 300. The live capture module 170 receives and stores the live stream in the original resolution it is being distributed. The live capture module 170 may also provide the low resolution proxy copy of the live stream video content. According to one embodiment of the disclosure, the live capture module generates the low resolution stream as it receives the high resolution stream and stores the low resolution stream in tandem with the high resolution stream. According to another embodiment of the disclosure, the encoder 114 generates the low resolution proxy video stream for use in editing. It is contemplated that the proxy video stream may include only a portion of the video frames of the high resolution video stream or may include markers inserted into the high resolution video stream by the content provider 110. At block 302, the low resolution video stream is provided to and stored in the edit stream module 184.

An edit module 186 provides an interface for individual editors 185 to edit the live stream video using the low resolution proxy video stream. Each editor 185 may access separate instances of the edit module 186, for example, by logging on a server in the cloud. Optionally, the edit module 186 may be provided as an application executing on a local processing device. The edit module 186 provides the interface for the editor 185 to select desired portions of the live streaming video.

At block 304, an editor requests a particular stream for editing. The edit module 186 transmits the request to the edit stream module 184. It is contemplated that the request may be sent directly. Optionally, the request may also be sent via the job manager 182 as shown in blocks 306 and 308. The job manager 182 may include one or more queues to manage various transmissions between each edit module 186 and the edit stream module 184. As shown in blocks 310 and 312, the low resolution video stream is transmitted back to the edit module 186 from the edit stream module 184 via the job manager 182.

The individual editor may search forward or backward through the low resolution video stream to identify one or more segments to be used from the original stream. At block 314, an editor 185 selects a start and end point for each desired segment. The edit module 186 generates a request and provides the start and stop points to the job manager 182 as shown in block 316. At block 318, the job manager 182 requests a portion of the high resolution video stream from the live capture module 170. The requested portion of the high resolution video stream corresponds to the start and stop points identified by the editor 185. The live capture module 170 returns the requested high resolution video stream to the edit module via the job manager 182 as shown in blocks 320 and 322.

Depending on the length of the high resolution video stream requested, the live capture module 170 may return a number of frames of high resolution video prior to and after each of the selected start and end points for display to the individual editor without providing the entire content between the two points. The high resolution content is displayed in the second viewing window 220 and/or the frame selection window 230. At block 324, each editor 185 may then navigate through the high resolution frames to select a frame accurate mark point for both the start and end of the desired high resolution video segment. Multiple editors 185 may access separate instances of the edit module 186 in tandem to provide each editor 185 the opportunity to select different segments of the live video stream.

The frame accurate start and stop points are used to generate the high resolution video segment desired by each editor 185. The frame accurate start and stop points are provided to the job manager 182 as shown in block 326. The job manager 182 receives the selection points from each editor and interfaces with the live capture module 170 to retrieve desired segments. The job manager includes a queue such that the number of requests does not exceed the bandwidth of the network between the job manager and the live capture module. As shown in block 328, the job manager transmits the desired start and stop points to the live capture module 170. The live capture module generates the requested high resolution video segment and transmits the high resolution segments to an edited content server 175. The edited content server may be one or more servers and may be, for example, a server belonging to the editor and may be specified by the editor during the editing session. Once the high resolution segment has been delivered, the job manager 182 removes the job from its queue.

Although the disclosure is discussed with respect to an embodiment illustrated in FIG. 6, it is contemplated that various operations of the method may be implemented in different orders or by different components as would be understood by one of ordinary skill without deviating from the scope of the disclosure. The illustrated embodiment is meant to facilitate understanding and is not meant to be limiting to a particular embodiment.

Portions of the disclosed embodiment are described herein as being implemented on various physical devices, including, but not limited to the video player 122, the manifest server 124, the key server 126, the encoder 114, the edge server 120 within a CDN 118, the live capture module 170, the edited content server 175 and devices executing the video editor 180. It would be understood by one skilled in the art that these devices may include processing devices, such as a single microprocessor, multiple microprocessors, co-processors, application specific integrated circuits (ASICs), or other computing devices operating separately, in tandem, or a combination thereof. Further, each of these devices includes storage which may include transitory storage, non-transitory storage, or a combination thereof. The storage may include memory devices such as random access memory (RAM), read-only memory (ROM), solid state memory, and the like. The storage may further include devices configured to read removable storage medium such as CD-ROMs, DVDs, floppy disks, universal serial bus (USB) devices, memory cards, and the like. The processing devices may be configured to read and execute instructions stored in non-transitory storage to perform various operations in the methods described herein.

It should be understood that the disclosure is not limited in its application to the details of construction and arrangements of the components set forth herein. The disclosure is capable of other embodiments and of being practiced or carried out in various ways. Variations and modifications of the foregoing are within the scope of the present disclosure. It also being understood that the technology disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A method to edit video content, comprising:
presenting a first resolution video item of a first resolution of the video content in an edit user interface, wherein the first resolution video item corresponds to a second resolution video item of a second resolution of the video content, wherein the first resolution video item includes fewer frames than the second resolution video item;
receiving, via the edit user interface, user input identifying at least one of a first start point or a first end point within the first resolution video item;
transmitting the first start point or the first end point to a server to obtain a respective first video segment of the second resolution video item;
presenting the respective first video segment of the first resolution video item in the edit user interface, the edit user interface comprising a frame identifying section to identify frames corresponding to the first start point or the first end point;
receiving, in view of the frames identified in the frame identifying section, user input identifying a second start point and a second end point within the presented first video segment of the second resolution video item; and
transmitting the second start point and the second end point to the server to obtain a respective second video segment from the second resolution video item for presentation to the user.

2. The method of claim 1 wherein the first resolution video item includes a plurality of thumbnail images and wherein each thumbnail image corresponds to one of a plurality of frames of the second resolution video item.

3. The method of claim 2 wherein each of the plurality of thumbnail images is representative of a scene in the video content.

4. The method of claim 2 wherein the edit user interface includes a slider bar to scroll through the plurality of thumbnail images, the slider bar comprising a left marker and a right marker to identify the first start point and the first end point respectively.

5. The method of claim 1 wherein the frame identifying section presents one or more frames immediately preceding or immediately following each of the first start point and the first end point in the second resolution video item.

6. The method of claim 1 wherein the frame identifying section allows a user to move forward or backward through the respective first video segment in the edit user interface on a frame-by-frame basis.

7. The method of claim 1 wherein the respective second video segment is presented in a viewing portion of the edit user interface.

8. The method of claim 1 further comprising:
allowing a user to edit the respective second video segment; and
providing the edited second video segment to a cloud-based storage location specified by the user.

9. A system to edit video content, comprising:
a memory; and
a processor, coupled to the memory, to perform operations comprising:
presenting a first resolution video item of a first resolution of the video content in an edit user interface, wherein the first resolution video item corresponds to a second resolution video item of a second resolution of the video content, wherein the first resolution video item includes fewer frames than the second resolution video item;
receiving, via the edit user interface, user input identifying at least one of a first start point or a first end point within the first resolution video item;
transmitting the first start point or the first end point to a server to obtain a respective first video segment of the second resolution video item;
presenting the respective first video segment of the first resolution video item in the edit user interface, the edit user interface comprising a frame identifying section to identify frames corresponding to the first start point or the first end point;
receiving, in view of the frames identified in the frame identifying section, user input identifying a second start point and a second end point within the presented first video segment of the second resolution video item; and
transmitting the second start point and the second end point to the server to obtain a respective second video segment from the second resolution video item for presentation to the user.

10. The system of claim 9 wherein the first resolution video item includes a plurality of thumbnail images and wherein each thumbnail image corresponds to one of a plurality of frames of the second resolution video item.

11. The system of claim 10 wherein each of the plurality of thumbnail images is representative of a scene in the video content.

12. The system of claim 10 wherein the edit user interface includes a slider bar to scroll through the plurality of thumbnail images, the slider bar comprising a left marker and a right marker to identify the first start point and the first end point respectively.

13. The system of claim 9 wherein the frame identifying section presents one or more frames immediately preceding or immediately following each of the first start point and the first end point in the second resolution video item.

14. The system of claim 9 wherein the frame identifying section allows a user to move forward or backward through the respective first video segment in the edit user interface on a frame-by-frame basis.

15. The system of claim 9, the operations further comprising: allowing a user to edit the respective second video segment; and
providing the edited second video segment to a cloud-based storage location specified by the user.

16. A non-transitory computer readable medium storing instructions, which when executed by a processor, cause the processor to perform operations comprising: presenting a first resolution video item of a first resolution of video content in an edit user interface, wherein the first resolution video item corresponds to a second resolution video item of a second resolution of the video content, wherein the first resolution video item includes fewer frames than the second resolution video item;
receiving, via the edit user interface, user input identifying at least one of a first start point or a first end point within the first resolution video item;
transmitting the first start point or the first end point to a server to obtain a respective first video segment of the second resolution video item;
presenting the respective first video segment of the first resolution video item in the edit user interface, the edit user interface comprising a frame identifying section to identify frames corresponding to the first start point or the first end point;
receiving, in view of the frames identified in the frame identifying section, user input identifying a second start point and a second end point within the presented first video segment of the second resolution video item; and
transmitting the second start point and the second end point to the server to obtain a respective second video segment from the second resolution video item for presentation to the user.

17. The non-transitory computer readable medium of claim 16 wherein the first resolution video item includes a plurality of thumbnail images and wherein each thumbnail image corresponds to one of a plurality of frames of the second resolution video item.

18. The non-transitory computer readable medium of claim 17 wherein each of the plurality of thumbnail images is representative of a scene in the video content.

19. The non-transitory computer readable medium of claim 17 wherein the edit user interface includes a slider bar to scroll through the plurality of thumbnail images, the slider bar comprising a left marker and a right marker to identify the first start point and the first end point respectively.

20. The non-transitory computer readable medium of claim 16 wherein the frame identifying section presents one or more frames immediately preceding or immediately following each of the first start point and the first end point in the second resolution video item.

21. The non-transitory computer readable medium of claim 16 wherein the frame identifying section allows a user to move forward or backward through the respective first video segment in the edit user interface on a frame-by-frame basis.

22. The non-transitory computer readable medium of claim 16, the operations further comprising: allowing a user to edit the respective second video segment; and providing the edited second video segment to a cloud-based storage location specified by the user.

* * * * *

UNITED STATES PATENT AND TRADEMARK OFFICE
CERTIFICATE OF CORRECTION

PATENT NO. : 12,236,980 B1
APPLICATION NO. : 18/091354
DATED : February 25, 2025
INVENTOR(S) : Alper Turgut, Oztan Harmanci and Ismail R. Haritaoglu Page 1 of 1

It is certified that error appears in the above-identified patent and that said Letters Patent is hereby corrected as shown below:

In the Claims

In Claim 1, Column 12, Line 32 delete "first resolution video" and insert --second resolution video--

In Claim 9, Column 13, Line 23 delete "first resolution video" and insert --second resolution video--

In Claim 16, Column 14, Line 18 delete "first resolution video" and insert --second resolution video--

Signed and Sealed this
Fifteenth Day of April, 2025

Coke Morgan Stewart
*Acting Director of the United States Patent and Trademark Office*